United States Patent [19]

Mendelsohn et al.

[11] 3,988,106
[45] Oct. 26, 1976

[54] SICKLE BLADE HEATER

[75] Inventors: Melvin D. Mendelsohn, Chicago; William G. Klima, Broadview, both of Ill.

[73] Assignee: Sola Basic Industries, Inc., Milwaukee, Wis.

[22] Filed: May 1, 1975

[21] Appl. No.: 573,533

[52] U.S. Cl. .............................. 432/230; 219/10.69
[51] Int. Cl.² ...................... F24J 3/00; H05B 5/08
[58] Field of Search .................... 219/10.69, 10.71; 432/225, 229, 230, 231

[56] References Cited
UNITED STATES PATENTS

| | | |
|---|---|---|
| 2,910,565 | 10/1959 | Osborn, Jr. et al. .......... 219/10.69 X |
| 3,540,704 | 11/1970 | Seijikarleta ..................... 432/230 X |
| 3,614,366 | 10/1971 | Huchok .......................... 219/10.69 |

Primary Examiner—John J. Camby
Attorney, Agent, or Firm—Smythe & Moore

[57] ABSTRACT

An apparatus for the edge heating of sickle blades having a pair of magazines for retaining a vertical stack of blades therein, a pair of heat-treating stations located inwardly of the magazines and a discharge chute between the stations. A guide and rod assembly is reciprocated by an eccentric between two positions for feeding a blade from a magazine to a heat-treating station and removing the treated blade from the heat-treating station to discharge the blade into a discharge chute.

7 Claims, 6 Drawing Figures

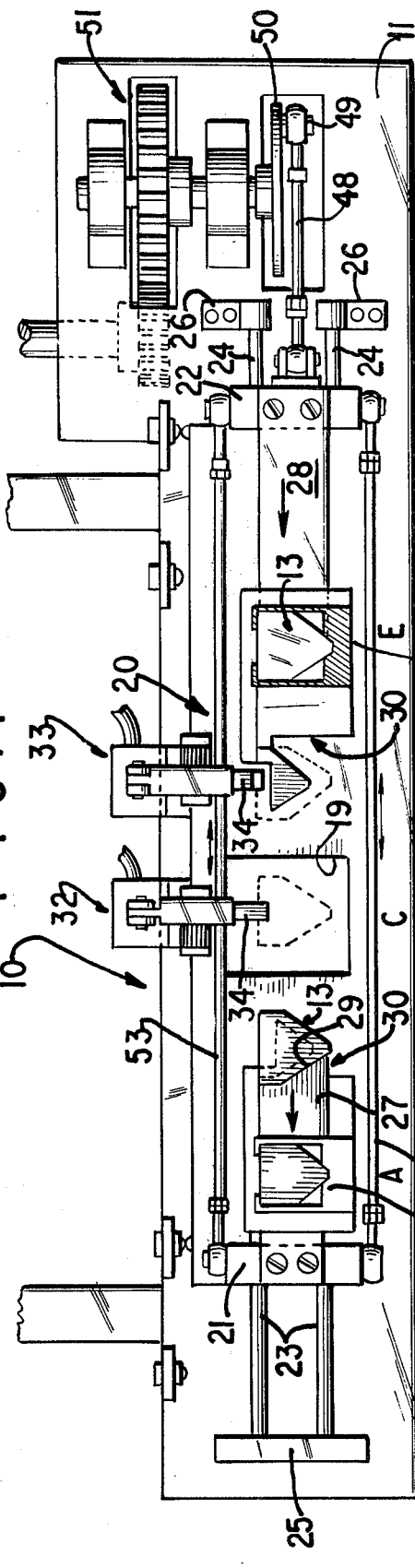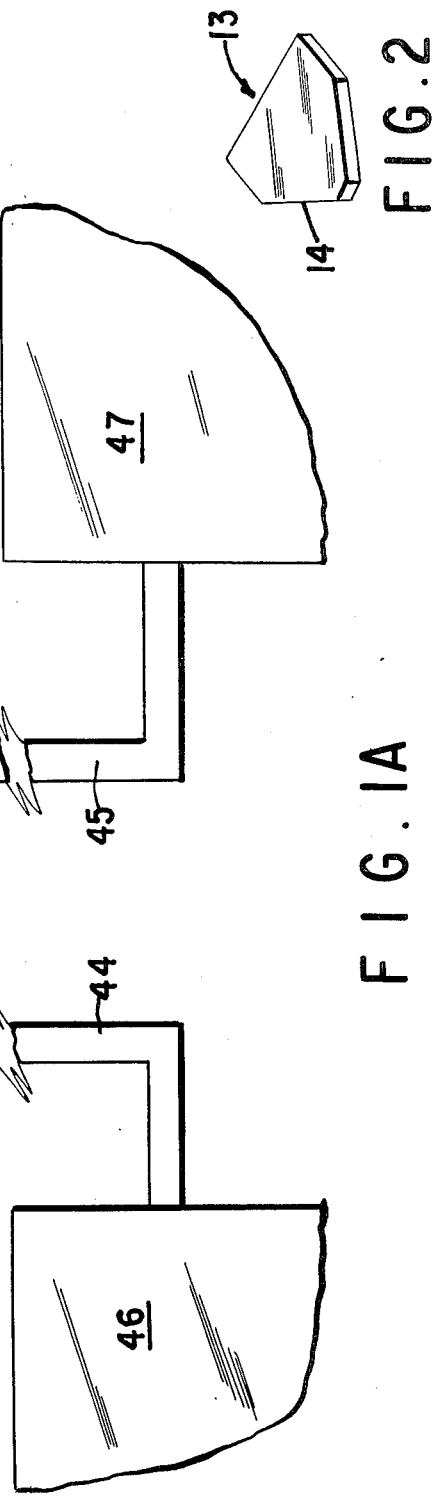

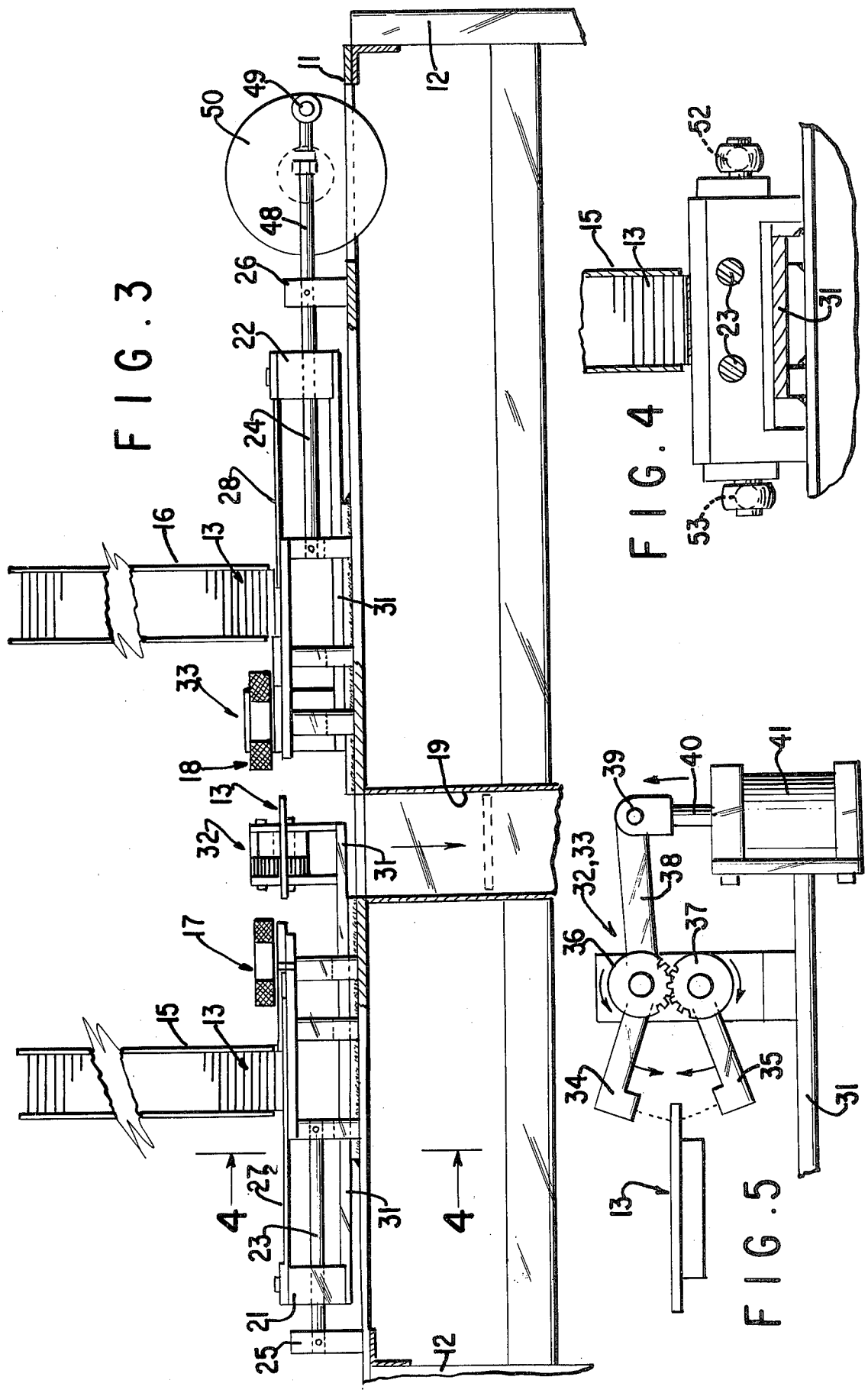

SICKLE BLADE HEATER

The present invention relates to a material-handling mechanism and, more particularly, to an apparatus for moving sickle blades from a magazine to a heat-treating position and then to a discharge chute.

Many operations in the manufacture of relatively small parts of a simple structure are excessively expensive since the parts must be handled by personnel during the operation. Such handling usually requires the removing of the part, such as a blade, from a magazine into a position where it is to be heat treated. Subsequently the treated blade must be removed from the heat-treating position and then transferred to a press for the next operation. Such an operation, which is unduly expensive, is the heat treating of the edges of a sickle blade. Each sickle blade must in turn be transferred to a heat-treating station wherein the edges of the blade are subjected to a heat-treating operation and the treated blade then removed and transferred for subsequent operations. Prior materials-handling structures utilized in such an operation have not been completely satisfactory because they were unduly cumbersome, occupied considerable space and required the constant attention of one or more skilled workers.

One of the objects of the present invention is to provide an improved apparatus for the transfer of sickle blades to and from a heat-treating operation.

Another of the objects is to provide such an apparatus which is automatic in operation, occupies a minimum of space and will continue to operate as long as a supply of plates to be treated exist.

Another of the objects is to provide such an apparatus which is simple in structure and reliable in operation.

According to one aspect of the present invention, an apparatus for the transfer of blades to and from a heat-treating station may comprise a pair of spaced magazines containing blades to be heat treated. Spaced heat-treating stations are positioned between the magazine and a discharge chute is located between the heat-treating stations. Means reciprocable between two positions feed a blade from a magazine into a heat-treating station and remove the blade from the heat-treating station to discharge the treated blade into the discharge chute.

Other objects, advantages and features of the present invention will become apparent from the accompanying description and drawings, which are merely exemplary.

In the drawings:

FIG. 1 is a top plan view of the apparatus according to the present invention;

FIG. 1A is a top schematic view of the heating heating inductors which are located over the blade heating station of FIG. 1;

FIG. 2 is a perspective view of a sickle blade which is to be subjected to an edge heat-treating operation;

FIG. 3 is a front elevational view of the apparatus of FIG. 1;

FIG. 4 is a sectional view taken along the line 4—4 of FIG. 3; and

FIG. 5 is an end elevational view of the clamping jaws for transferring a blade from a heat-treating station to the discharge chute.

Proceeding next to the drawings wherein like reference symbols indicate the same parts throughout the various views, a specific embodiment of the present invention will be described in detail.

With particular reference to FIGS. 1 and 3, the transfer apparatus of the present invention is indicated generally at 10 and comprises a base or frame 11 in the form of a table or metal structural elements supported on legs 12. The sickle blade having edges 14 to be heat treated is shown at 13 in FIG. 2. A plurality of the sickle blades are supplied to magazines 15 and 16 in the form of a vertical stack so that the blades lie flat upon each other.

Located inwardly between the spaced magazines are heat-treating stations 17 and 18 and between the heat-treating stations is a common discharge chute 19. It is noted that the loading magazines 15 and 16, the heat-treating station 17 and 18, and the discharge chute 19 are arranged in substantially a straight line on frame 11 of the apparatus.

A slidable guide and rod assembly indicated generally at 30 (FIG. 2) is mounted on the upper surface of frame 11 and comprises end blocks 21 and 22 which are slidably mounted on stationary guide rods 23 and 24. Guide rods 23 and 24 are mounted in brackets 25 and 26, respectively, which are also fixed upon the upper surface of the frame.

Attached to the end blocks 21 and 22 are stripper plates 27 and 28 whose inner ends 29 and 30 are shaped as seen in FIG. 1 for removing a blade from the bottom of the respective magazines 15 and 16.

Mounted in the central portion of the guide and rod assembly 20 are plates 31 and 31A which are slidably positioned upon stationary guide plates located on the frame 11. Mounted on the respective slide plates are clamping units 32 and 33, each of which consists of a pair of pivotable jaws 34 and 35 (FIGS. 1, 5) extending outwardly from meshing gears 36 and 37. An arm 38 extends outwardly from gear 36 and is pivotally connected by a pin 39 to a rod 40 extending from a piston within fluid-actuated cylinder 41. The actuation of the cylinder 41 will bring about mutual clamping and releasing action of the jaws 34 and 35 with respect to a sickle blade 13 therebetween.

Heating coils 42 and 43 of heat-treating stations 17, 18 are positioned in line with the magazines 15 and 16. The heating coils or inducting heating elements are shown in FIG. 1A laterally removed from the apparatus for purposes of clarity. The heating coils are each connected through suitable conduits or leads 44 and 45 to electrical heating equipment 46 and 47 as is known in the art.

The guide and rod assembly 20 is reciprocated on the upper surface of the frame 11 by means of a tie rod 48 (FIGS. 1, 2) eccentrically connected at 49 to a disc 50 of a suitable drive assembly indicated generally at 51.

The end blocks 21 and 22 of the slide assembly 20 are interconnected by parallel rods 52 and 53 (FIG. 1).

By use of two load magazines 15 and 16, the apparatus will provide two-station operation with a common discharge chute. The discharge chute can feed the blades directly into a press or other operation. The basic operation of either side of the apparatus is to move a blade 13 from a magazine 15 or 16 into a heating position beneath one of the heating coils 42 and 43. At the same time one of the jaws 32 or 33 will take hold of a blade within a heating station and retain the blade until it is positioned over the discharge chute by movement of the assembly 20. Thus, the apparatus functions to move a blade into the heating coil and to remove a blade from the heating coil or heat-treating station. The alternate operation of both sides of the slide assembly allows a steady flow of heated blades to be dropped into the discharge chute to feed the press or other device.

If desired, the eccentric 50 can be geared through the drive assembly 51 to the fly-wheel shaft of the forging press to which the heat-treated blades are supplied through chute 19.

In order to describe sequence of operation of the apparatus, it is to be noted that there are two basic positions of the slide assembly 20. These positions may be described as Position 1, in which the assembly is shown in FIGS. 1 and 3, and Position 2, in which the assembly 20 is moved to its other extreme position by rotation of the eccentric through an angle of 180°. As the press rotates, the eccentric 50 will cause the slide assembly to reciprocate between Positions 1 and 2.

The relative positions of the magazines 15 and 16 are indicated at A and E in FIG. 1, the positions of the heat-treating stations indicated at Positions B and D in FIG. 1, and the positions of the discharge chute at C.

Assuming that both of the magazine stacks 15 and 16 are full with the press rotating and the slide assembly being in the position as shown in FIGS. 1 and 3, heating coil 42 will be energized so as to be heating the plate at station B and the heat is shut off at heating coil 43 at station D. The jaws of clamps 33 will clamp the heated blade into the chute 19 at Position C and at the same time stripper plate 28 will push a blade from the bottom of magazine 16 at E into heating station D which will be energized.

The heat is shut off at station B and the clamping device 32 will clamp the heated blade at station B. As the slide assembly returns to Position 1 of FIGS. 1 and 3, the clamps 32 will drop the heated blade into chute 19 at station C and shear plate 27 will push a blade from magazine 15 at station A into heating Position B.

The operation will then be repeated continuously as the eccentric 50 turns in synchronism with the forging press. The heat is turned on and off at station B and D at appropriate times by suitable limit switches and timers which are known in the art.

Thus, it can be seen that the present invention has provided an apparatus which is simple in structure and reliable in operation for the automatic transfer or sickle blades from a magazine to a heat-treating station and then to a discharge chute. Since each movement of the slide assembly releases a heated blade into the discharge chute, it will be apparent that a continuous supply of such blades will be provided to a forging press or other operation.

It will be understood that various details of construction and arrangement of parts may be changed without departing from the spirit of the invention except as defined in the appended claims.

What is claimed is:

1. In an apparatus for the transfer of blades to and from a heat-treating station, the combination of a pair of spaced magazines, each containing blades to be heat treated, a pair of heat-treating stations between said magazines, a discharge tube between said heat-treating stations, and means reciprocable between two positions for feeding a blade from a said magazine to a heat-treating station and removing the treated blade from the heat-treating station to discharge the treated blade into said discharge chute, said reciprocable means having means for stripping a blade from a magazine and means for clamping a blade in a heat-treating station.

2. In an apparatus as claimed in claim 1 wherein there are two stripping means and two clamping means on said reciprocable means.

3. In an apparatus as claimed in claim 2 wherein said two stripping means are at each end of said reciprocable means and each of said clamping means is inwardly of a stripping means.

4. In an apparatus as claimed in claim 1 wherein said clamping means comprises a pair of jaws, and means for clamping said jaws upon a blade in a heat-treating station and for releasing the jaws when the blade is positioned over the discharge chute.

5. In an apparatus as claimed in claim 1 and eccentric means operatively connected to said reciprocable means for reciprocating said means between two positions.

6. In an apparatus as claimed in claim 1 wherein said magazines each retain a vertical stack of blades and each has means at the bottom thereof for laterally removing a blade therefrom.

7. In an apparatus as claimed in claim 6 wherein said blade stripping means comprises a shear plate engageable with a bottom blade in a said magazine to transfer the blade to a heat-treating station.

* * * * *